Figure 1:
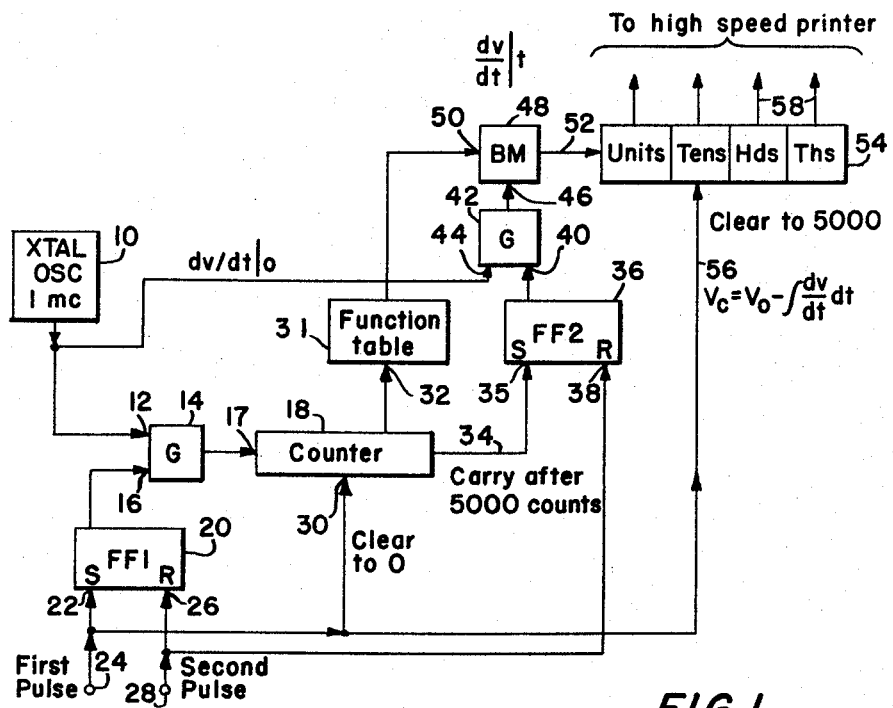

United States Patent Office 2,962,214
Patented Nov. 29, 1960

2,962,214

FUNCTION GENERATING APPARATUS

Bernard M. Gordon, Newton, and Marshall M. Kincaid, Arlington, Mass., assignors to Epsco, Incorporated, Boston, Mass., a corporation of Massachusetts Filed Nov. 28, 1955, Ser. No. 549,400

8 Claims. (Cl. 235—164)

The invention relates to function generating apparatus, and more particularly to function generating apparatus utilizing digital techniques.

Heretofore, function generating apparatus have utilized mechanical and electrical devices which have been relatively inefficient and expensive in construction and operation.

It is therefore a primary object of the invention to provide a new and improved function generating apparatus utilizing digital operational methods and controls.

Another object of the invention is to provide a new and improved function generating apparatus performing operations and computations in real time.

Another object of the invention is to provide a new and improved function generating apparatus producing a required function with the degree of precision required.

Another object of the invention is to provide a new and improved function generating apparatus which is efficient in operation and inexpensive to construct and maintain.

Another object of the invention is to provide a new and improved function generating apparatus which may be digitally controlled and coordinated in time relationship with other apparatus or circuits for performing various operations.

Another object of the invention is to provide a new and improved function generating apparatus which may be accurately controlled with respect to time before and during its generating operations.

Another object of the invention is to provide a new and improved function generating apparatus which is particularly adapted for use in timing devices.

Another object of the invention is to provide a new and improved function generating apparatus for timing the velocity of an object between two points and producing the result at the time the object passes the second location.

Another object of the invention is to provide a new and improved function generating apparatus which is highly adaptable for various uses and circuit arrangements.

Another object of the invention is to provide a new and improved measuring and computing apparatus which carries out and completes its computing operation during its measuring operation.

Another object of the invention is to provide a new and improved apparatus for generating a function by delivering signals at various selected rates to a counting device.

Another object of the invention is to provide a new and improved apparatus for generating a function with respect to time which closely approximates a predetermined relationship.

Another object of the invention is to provide a new and improved apparatus for generating a function which may be easily and efficiently effected by electrical equipment.

Another object of the invention is to provide a new and improved apparatus for generating a predetermined function utilizing digital counting techniques.

The above objects as well as many other objects of the invention are achieved by providing an apparatus in which a register or a counting device receives signals at a rate determined by a rate multiplier network. The rate multiplier network receives activating signals of a predetermined frequency from a pulse generator and has a plurality of rate control lines. A function table circuit delivers output signals to the control lines of the rate multiplier network determining the rate at which it delivers signals to the counting device. The output signals from the function table circuit are time controlled and changed by signals received from a second counting or timing device.

Thus, by controlling the rate at which count signals are delivered to the first counting device during successive intervals, the count of the device changes with time to generate a function. The function generated by the counting device may be predetermined by the output control signals produced by the function table, the sequence of the signals, and the time interval during which they are effective.

Figure 2:
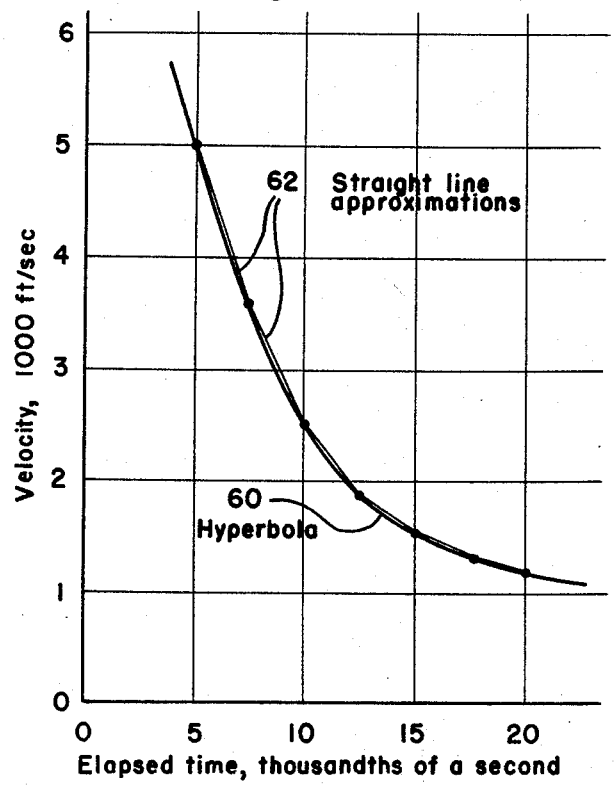

The above objects as well as many other objects of the invention will be apparent when the following description is read in conjunction with the drawings, in which:

Figure 1 is a schematic illustration in block form of a recording velocity meter embodying the invention, and Figure 2 graphically illustrates the function generated by the apparatus of Figure 1.

The figures illustrate the function generating apparatus and method of the invention as utilized in a recording velocity meter. The recording velocity meter is particularly adapted to measure the muzzle velocity of a bullet. The bullet passes through first and second solenoidal transducers which are spaced apart a predetermined distance and produce respective pulse signals. The velocity of the bullet is completely computed and printed at the time the bullet passes through the second solenoidal transducer, computation being carried on by the velocity meter during the period of travel of the bullet between the first and second transducers.

The pulse generating unit 10 shown in Figure 1 generates signals at the frequency of 1 megacycle. The signals from the generating unit 10 are delivered to the first input lead 12 of a gating circuit 14 which has its second input lead 16 connected with the output line of a bi-stable or flip-flop circuit 20. The output line of the gating circuit 14 is connected to the input line 17 of a binary counting device 18.

The flip-flop circuit 20 has a set terminal 22 joined with a signal input terminal 24, while its reset lead 26 is joined with a second input terminal 28.

The clear input lead 30 of the counter 18 is connected with the first input terminal 24, while its output line is connected with the control line 32 of a function table network 31. The carry output line 34 of the counter 18 is connected with the set lead 35 of a bi-stable or flip-flop circuit 36.

The flip-flop circuit 36 has its reset lead 38 joined to the second input terminal 28, and its output line joined to the first input line 40 of a signal gating circuit 42.

The signal gating circuit 42 has its second input lead 44 joined with the output of the signal generating unit 10, while its output delivers activating signals to the input line 46 of a binary rate multiplier network 48.

The binary rate multiplier network 48 has its input control leads 50 excited by output signals from the function table circuit 31, while its output line 52 delivers excitation to a recording device or counter 54. The counter 54 is provided with a plurality of output leads 58 which may energize a high speed printing mechanism.

The function table circuit 31 is of the well known type having a plurality of output lines energizing the input control leads 50 which are energized in predetermined combinations or codes as determined by the input signals or energizing pulses delivered to it. The pulse energized type of function table circuit is provided with a sequencing means for determining the order in which the coded output signals are produced, while the timing of the control pulses determines the interval of such coded output signals. These circuits are well known in the art, and are described in detail in U.S. Patent No. 2,686,299, especially Figures 4 and 6. For example, the input pulses are delivered to line 420 for sequencing the energization of selected output lines, while the signals from such output lines are encoded by the function table of Figure 6 for delivering appropriate sequenced control signals to the input control leads of the binary rate multiplier network 48.

The output coded signals are delivered to the binary rate multiplier network 48 which may be of the type described by Bernard M. Gordon and R. N. Nicola in an article entitled "Special Purpose Digital Data Processing Computers" published in the Proceedings of the Association for Computing Machinery of May 1952.

In the operation of the recording velocity meter which shall now be described for the purpose of illustrating the invention, a first pulse is delivered to the input terminal 24 when the bullet passes the first solenoidal transducer. This pulse sets the flip-flop 20 and clears the counter 18 to a zero reading.

With the flip-flop 20 in its set state, its output line is energized delivering a gating signal to the gate circuit 14 permitting it to pass signals from the signal generating unit 10 to the counter 18.

After 5000 counts the counter 18 delivers a carry signal to the flip-flop 36 placing it in its set state. In its set state, the flip-flop 36 delivers a gating signal to the gate circuit 42 which permits the delivery of signals from the generator unit 10 to the actuating input lead 46 of the binary rate multiplier 48. The function table circuit 31 which is controlled by the counter 18 delivers coded output signals to the binary rate multiplier 48 which determines the rate at which count signals are delivered over its output line 52 to the counting device 54.

The counter 54 which was cleared to the count value of 5000 with the delivery of the first pulse to the input terminal 24, for this particular application, is of the type which counts backwards with the delivery of input signals from the line 52. Thus, in effect, the signals delivered to the unit reduces the value of 5000 initially assumed by the counter 54. A counter of this type which may be utilized in this application is the forward-backward counter which is fully described in connection with Figure 4 of the application for U.S. Letters Patent of Bernard M. Gordon and Robert P. Talambiras, entitled Signal Translating Apparatus and Method, filed July 22, 1955, Serial No. 523,798.

In this manner, the count of the counter 54 generates a function which is illustrated by the straight line approximation 62 to the hyperbola 60 shown in Figure 2. For example, when the carry count is delivered by the counter 18, a period of five thousandths of a second have elapsed. Until this time the counter 54 is maintained at a count of 5000.

The delivery of a carry signal to the flip-flop 36 places it in its set state which allows the gating circuit 42 to deliver signals at a frequency of 1 megacycle to the binary rate multiplier 48. Upon actuation by these signals, the binary rate multiplier network 48 delivers output signals to the counter 54. These signals reduce the count of the counter from the value of 5000. The rate at which the count 5000 is reduced depends upon the rate of output signals delivered by the binary rate multiplier 48.

Referring to the graph of Figure 2, it is noted that at an elapsed time of 5 thousandths of a second, the count of the counter 54 is 5000 which represents the muzzle velocity in feet per second. With the passage of time the count of the counter 54 decreases as represented by the downwardly sloping straight line 62 which approximates the hyperbola 60. The slope of the line 62 indicates the rate at which the counter 54 is reducing its count. For the purpose of this apparatus, it is desired to generate a function which is a hyperbola shown by the curve 60 of Figure 2. Sufficient accuracy is attained by use of the straight line approximations 62 generated by the apparatus. It is noted that in order to conform with the hyperbola the straight line approximations 62 have various slopes, the slope of the line 62 being negative and decreasing with the increase of the elapsed time.

In the operation of the apparatus, after an initial time lapse, the counter 18 energizes the function table 31 to appropriately control and change the signals delivered to the binary rate multiplier 48 for affecting the rate at which count signals are delivered to the counting unit 54. Thus, for example, sequentially decreasing rate codes are delivered by the function table circuit 31 in response to timing signals received from the counter 18. These timing signals from the counter 18 are shown by the graph of Figure 2 to occur at approximately 5, 7.5, 10, 12.5, 15, 17.5 and 20 thousandths of a second after delivery of the first pulse to the input terminal 24.

When the bullet passes through the second solenoidal transducer, a second pulse is delivered to the input terminal 28 which resets the flip-flops 20 and 36. This prevents the delivery of signals from the generator unit 10 to the control counter 18 and to the binary rate multiplier 48. The count present in the counter 54 at this time may be used to energize a high speed printer which records its value which is the measured muzzle velocity of the bullet. In this manner, the device computes during the period of measurement, and has the result at the time the measurement is completed. It will be evident that the count of the counter 54 at the time the second pulse is delivered to the input terminal 28 is the value of the muzzle velocity from the following explanation.

Assuming that the velocity of the bullet as it leaves the gun is substantially constant for a short distance such as 25 feet, the velocity is given by the following relationship:

$V = d/t$ $d$ = distance between solenoidal transducers
$t$ = time of projectile flight This hyperbolic relationship is shown in Figure 2 by curve 60. The apparatus finds speed by a counting process which essentially computes the relationship:

$$V_c = V_o - \int dv/dt \, dt$$

where $V_c$ = "counted" velocity
$V_o$ = maximum possible velocity and
$dv/dt$ = rate of change of measured velocity with time.

The curve of Figure 2 shows that for a projectile flight distance of 25 feet the minimum elapsed time of flight with a maximum velocity of 5000 feet per second is 5 thousandths of a second. Since the maximum velocity of the object to be measured will not exceed 5000 feet per scond, the backward counting process is initiated after an elapsed time of 5 thousandths of a second at a count of 5000. The count of the counter 54 is then reduced along the straight line approximation 62 to the hyperbola 60 for an interval of 2.5 thousandths of a second, at which time the counter 18 energizes the function table 31 for changing the rate control signals delivered to the binary rate multiplier 48. The rate control signals delivered at this time by the function table circuit 31 is slightly reduced so that the straight line 62 still approximates the hyperbola 60. At intervals of 2.5 thousandths of a second, the counter energizes the function table 31 to change the rate control signals to the binary rate multiplier network 48 to continually approximate the hyperbola 60.

Thus when the second signal is delivered to the second input terminal 28 which terminates the counting operation of the counting device 54, the count at that time which is retained by the counter 54, is the muzzle velocity in feet per second of the bullet passing through the first and second solenoidal transducers. By this means, the velocity or speed information desired is available when the measuring operation is completed and no additional time is needed for computation purposes after the interval of time measurement. This is known as operation in real time.

The second pulse delivered to the second input terminal 28 also conditions the apparatus for the following measuring operation during which first and second pulses are again delivered to the first and second input terminals 24, 28.

Although specific types of circuits such as the counter 18, the function table circuit 31, the binary rate multiplier 48 and the recorder or counting device 54 have been indicated in block form with specific designations, it will be noted that other functionally similar timing and control devices may be utilized to produce the structure and method of the invention.

It is also noted thta counter 18 may readily be replaced in some instances by a timing device such as a delay line having various taps along its line for supplying timing and control signals. The counting device 54 may also be replaced by a recording device which does not perform a counting operation but is sensitive to the rate of signals delivered to it for generating a function.

The function generating apparatus and method embodied in the illustrated recording velocity meter may be utilized with appropriate adaptations and modifications for generating functions required for other devices and operations without departing substantially from the spirit of the invention. For example, functions have negative and positive slopes may be generated by utilizing a counting device 54 having forward and backward control input leads so that the count may increase and decrease as a function of time. The binary rate multiplier 48, function table circuit 31 and counting device 18 may also be replaced by analogous apparatus for generating various curves to the degree of precision desired.

Although the function generating apparatus and method have been disclosed with reference to a particular utilization and function, it will be obvious to those skilled in the art that the invention may be modified and adapted for generating functions for various other devices and for other particular applications, without substantially departing from the spirit of the invention.

What is claimed is:

1. Apparatus for providing an output signal having a rate which varies as a predetermined function of time compromising, a binary rate multiplier having an actuating input lead, rate control leads and an output lead, a source of rate control signals coupled to said rate control leads, a source of actuating signals coupled to said actuating input lead, and means for altering said rate control signal in accordance with said function to provide said output signal on said output lead.

2. Apparatus for providing an output signal having a rate which varies as a predetermined function of time comprising, a binary rate multiplier having an actuating input lead, rate control leads and an output lead, a source of actuating signals coupled to said actuating input lead, a source of rate control signals coupled to said rate control leads, a source of control signals, and means responsive to said control signals for altering said rate control signal in accordance with said function to provide said output signal on said output lead.

3. Apparatus for providing an output signal having a rate which varies as a predetermined function of time comprising, a binary rate multiplier having an actuating input lead, rate control leads and an output lead, a source of periodic pulses, means for coupling said periodic pulses to said actuating input lead, a source of rate control signals coupled to said rate control leads, and means responsive to said periodic pulses for altering said rate control signal in accordance with said function to provide said output signal on said output lead.

4. Computing apparatus comprising, a binary rate multiplier having an actuating input lead, rate control leads and an output lead, a source of periodic pulses, means for coupling said periodic pulses to said actuating input lead, a source of rate control signals coupled to said rate control leads, means responsive to said periodic pulses for altering said rate control signal in accordance with a predetermined function to provide an output pulse train having a rate related to time by said function, and a counter whose count is altered in response to said output pulse train.

5. Computing apparatus in accordance with claim 4 and further comprising means for controlling the time intervals in which said periodic pulses are delivered to said actuating input lead and to said rate control signal altering means to provide a count in said counter indicative of the value of said function at a time related to the duration of said intervals.

6. Computing apparatus comprising, a binary rate multiplier having an actuating input lead, rate control leads and an output lead, a source of periodic pulses having a rate characteristic of the time derivative of a quantity at a reference time, a source of rate control signals coupled to said rate control leads, means responsive to said periodic pulses for altering said rate control signals in accordance with the known variation of said quantity as a function of time, means for applying said periodic pulses to said actuating input lead to provide an output pulse train having a rate altered in accordance with said rate control signals, and a counter responsive to said output pulse train for storing a count therein characteristic of said quantity at a later time after said reference time.

7. Apparatus in accordance with claim 6 and further comprising, means for initially setting said counter to a predetermined count corresponding to the value of said quantity at said reference time, said counter responding to each of said output pulses by reducing the count stored therein, and means for controlling the duration said periodic pulses are applied to said actuating signal input whereby at the end of said duration said count is characteristic of said quantity for said later time separated from said reference time by said duration.

8. Computing apparatus comprising, a binary rate multiplier having an actuating input lead, rate control leads, and an output lead, a source of periodic pulses, a source of rate control signals coupled to said rate control leads, a first counter storing a control count, first gating means for coupling said periodic pulses to the input of said first counter when enabled, second gating means for coupling said periodic pulses to said actuating input lead when enabled, a second counter for storing an output count and energized from said rate multiplier output lead, said second counter responding to each energizing pulse by altering said output count, means for simultaneously enabling said first gating means, clearing said first counter to zero and establishing a predetermined count in said second counter at a first time, said rate control signal source responding to said control count by altering said rate control signals in accordance with a predetermined function, means responsive to said first counter reaching said predetermined count for enabling said second gating means at a second time after said first time, and means for disabling said first and second gating means at a third time later than said first time.

References Cited in the file of this patent

UNITED STATES PATENTS

| | | |
|---|---|---|
| 2,500,294 | Phelps | Mar. 14, 1950 |
| 2,686,299 | Eckert | Aug. 10, 1954 |
| 2,697,549 | Hobbs | Dec. 21, 1954 |
| 2,700,750 | Dickinson | Jan. 25, 1955 |
| 2,702,367 | Ergen | Feb. 15, 1955 |
| 2,769,595 | Bagley | Nov. 6, 1956 |

OTHER REFERENCES

Gordon: Special-Purpose Digital Data-Processing Computers, Proceedings of the Association of Computing Machinery, May 2 and 3, 1952 (pages 33 to 45).

Burke, Jr.: A Survey of Analog-to-Digital Converters, Proceedings of the I.R.E., October 1953 (page 1459).

Gordon: An Operational-Digital Feedback Divider, Transactions of the I.R.E. Professional Group on Electronic Computers, March 1954 (pages 17 to 20).

Shulman: Accurate Tachometry Methods with Electronic Counters, A.I.E.E. Transactions, November 1954 (page 454).